June 6, 1944.  B. ENDER  2,350,327
HYDRAULIC SCOOP
Filed Aug. 31, 1940   2 Sheets-Sheet 1

INVENTOR.
BENJAMIN ENDER.
BY HIS ATTORNEYS
Williamson + Williamson

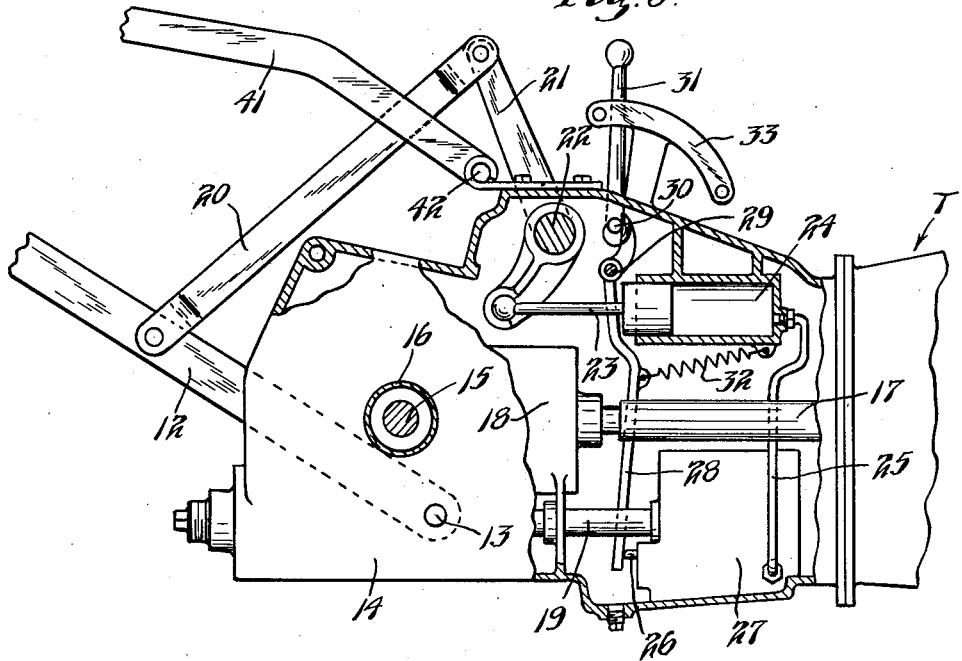

Patented June 6, 1944

2,350,327

UNITED STATES PATENT OFFICE.

2,350,327

HYDRAULIC SCOOP

Benjamin Ender, Hokah, Minn.

Application August 31, 1940, Serial No. 354,919

8 Claims. (Cl. 37—126)

This invention relates to earth handling apparatus and more particularly to scoops which are adapted to be used in combination with automotive tractors having drawbar mechanism which can be raised and lowered by power.

Heretofore tractors have been manufactured with drawbars connected to hydraulic or other power means for lifting and lowering the drawbars. Various types of earth collecting and dumping mechanism in the form of scoops have also been used. In one form the scoop is dragged through or over the ground until it is filled with earth and then it is further dragged to the spot where the earth is to be dumped. Another form of earth moving apparatus is a scoop structure mounted on wheels as a self-contained wheeled unit, and this unit can be moved over the ground. Hydraulic mechanism has been used to raise the scoop upon its frame so that the scoop wheels can be utilized to transport the load.

It is an object of my invention to provide a scoop in combination with a tractor having a power lift associated with its drawbar mechanism so that the scoop can be drawn behind the tractor until it is filled with earth and then can be raised completely out of contact with the ground and transported to the point of deposit where it can be dumped while still in its elevated position, thus permitting the elevated movement of dirt and eliminating the wear and extra power resulting from dragging of the loaded scoop on the ground and also enabling the transfer of dirt out of contact with the ground and in combination with a conventional tractor. By providing scoop means which can be lifted by the tractor and transported while supported by the tractor wheels the cost of a self-supported scoop is eliminated and an apparatus of extreme flexibility of use is produced.

A further object of the invention is to provide a scoop combined with a tractor having a power lift drawbar in combination with means for maintaining the scoop at a proper position either when raised or lowered to prevent the loss of dirt when transporting the loaded scoop in its elevated position.

A further object of the invention is to provide a structure as described above wherein the loaded and elevated scoop with the tractor can be moved in a reverse direction such as is impossible with the conventional type of drag scoop.

These and other objects and advantages of the invention will more fully appear from the following description made in connection with the accompanying drawings, wherein like reference characters refer to the same parts throughout the views, and, in which:

Fig. 6 is an enlarged view of the rear portion of a tractor with portions broken away to show the general arrangement of hydraulic elevating means for the drawbar.

Figure 1:
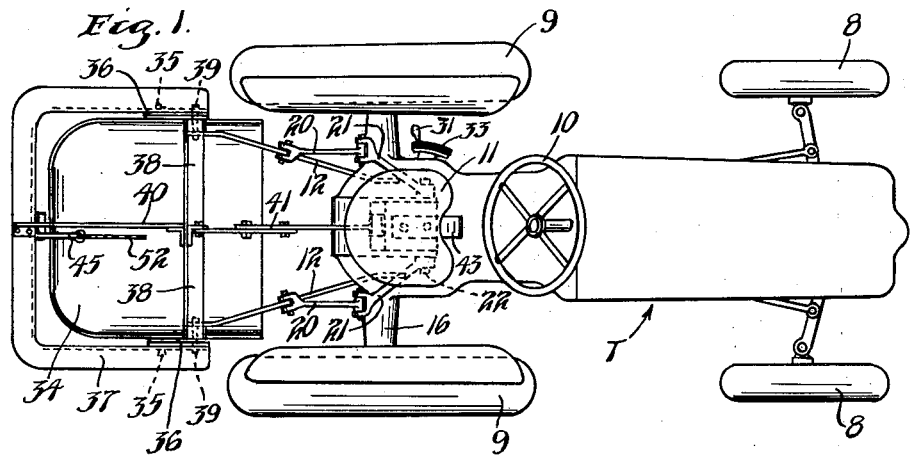
Fig. 1 is a plan view of a tractor and scoop arranged in accordance with my invention.

The drawings show a tractor T having front wheels 8 and rear wheels 9. There is also shown a steering wheel 10 and operator's seat 11. A pair of drawbar elements 12 are pivotally connected at 13 to the differential housing 14 of the tractor. The tractor rear axle is shown at 15 within a housing 16 extending from the differential housing 14. In Fig. 6 there is shown a main tractor drive shaft 17 which extends rearwardly to the differential housing 18. A power takeoff shaft 19 is shown below the drive shaft 17 and rear axle 15.

The drawbars 12 are pivotally connected by means of links 20 to a lever arm 21 which is pivoted to a short cross shaft 22. The lower end of the lever 21 below the pivot shaft 22 is connected to a piston 23 operating in a cylinder 24. The right-hand end of the cylinder 24 has a liquid line 25 which connects through a suitable valve whose stem is shown at 26 to a hydraulic pump 27 which is operated from the power takeoff shaft 19. A valve control lever 28 extends from valve 26 upwardly past a pivotal suspension 29 and is adapted to contact an eccentric or crank 30 extending outwardly from a hand control lever 31. A tension spring 32 normally pulls the valve operating lever 28 to the right or forwardly of the tractor to push in the valve stem 26 to maintain the valve closed. The valve 26 closes a return bypass in the pump 27 and causes liquid under pressure to flow through the conduit 25 and into the cylinder 24 to force the piston 23 to the left. This causes the upper end of the lever 21 to swing to the right pulling upwardly on link 20 and the drawbar 12 which swings on its pivot 13. When the lever 31 is pulled to the right on its bracing rack 33 the crank or eccentric 30 will bear against the upper end of the valve operating lever 28 causing the lower end of said lever 28 to swing to the left or rearwardly and permitting the valve 26 to open and produce a bypass of liquid from the outlet of pump 27 back to its inlet. This bypassing relieves liquid pressure in the cylinder 24 and line 25 so that the weight of the drawbar or any structure attached thereto will cause the drawbar 12 to be lowered. The valve 26 can be set in any desired intermediate position to maintain the drawbar 12 in an intermediate position likewise. Further details of the hydraulic mechanism and valve control are not shown since they exemplify but one form of power lift and are fully disclosed in Patents No. 2,118,180 and No. 2,118,-181, issued to Henry George Ferguson on May 24, 1938.

Figure 2:
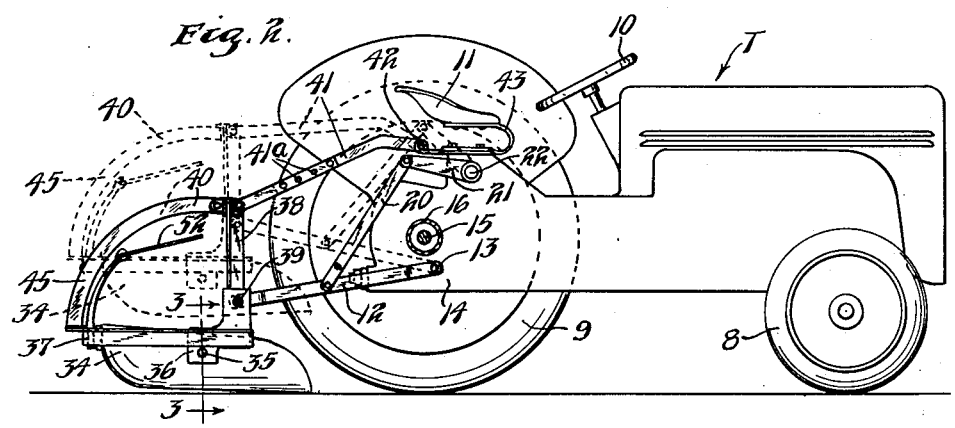
Fig. 2 is a side elevation showing the scoop and hitch in full lines in lowered position and in dotted lines in raised position.
Figures 3, 4, 5:
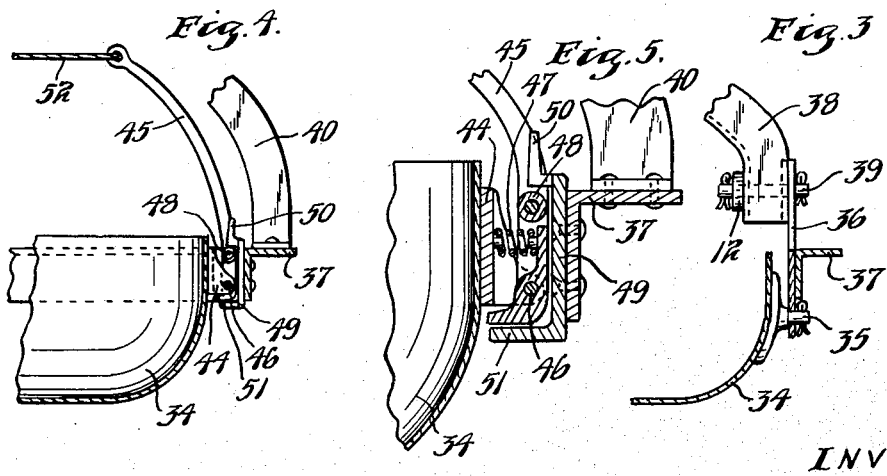
Fig. 3 is a fragmentary vertical section on an enlarged scale taken approximately on line 3—3 of Fig. 2.
Fig. 4 is an enlarged fragmentary longitudinal section through the scoop release mechanism at the rear thereof.
Fig. 5 is a view somewhat similar to Fig. 4 on a larger scale and with the release mechanism itself in section.

A dirt scoop 34 is pivotally connected at 35 to a plate 36 which is welded or otherwise secured to a piece of angle iron 37 formed in substantially U-shape and comprising the lower portion of the scoop supporting frame. An arched member 38 is connected to the plate 36 by a pin 39 at each side of the forward portion of the lower frame member 37. A curved brace member 40 extends from the upper central portion of the frame arch 38 to the rear central portion of the lower frame member 37. The tractor draw-bar members 12 extend rearwardly from their point of pivotal connection with the tractor and the rear ends of said drawbars connect with the pins 39 which also secure the frame arch 38. A two piece connecting link 41 which may be adjustable in length if desired, as by means of a plurality of bolt holes 41a is connected between the upper central portion of the arch frame member 38 and a bracket 42 which may be formed as a portion of the seat supporting bracket 43 if desired. The positioning and lengths of the drawbars 12 and the upper link connection 41 are such that when the drawbars are elevated by the hydraulic mechanism described the scoop will be lifted upwardly and maintained at the desired angle. It will be noted in Fig. 2 that when the scoop is lowered in dirt gathering position the frame and scoop will tilt forwardly slightly and when it is raised, as shown in the dotted line position of Fig. 2, the scoop and frame will tilt rearwardly slightly. This latter position prevents dirt from falling from the scoop when being transported. Even in the slightly rearwardly tilted position, however, with a normal load the scoop when released is so weighted with its load that it will tilt forwardly and dump automatically.

At the rear of the scoop 34 is a generally U-shaped element 44 between the arms of which is pivotally mounted a curved lever 45. This lever is shown pivoted to the element 44 at the point 46. A compression spring 47 is interposed between the U-shaped member 44 and the lower portion of the curved lever 45 above the pivot point 46 to normally urge the longer portion of the lever rearwardly. Just above the spring 47 a roller 48 is connected to the curved lever 45.

Mounted on the inner face of the rear central portion of the U-shaped lower frame member 37 is a combined catch and stop member 49 which has a substantially right-angled upper catch portion 50 beneath which the roller 48 on the spring pressed lever 45 is adapted to snap when the scoop has been tilted and is returned to its substantially level position. The element 38 has a horizontally disposed stop member 51 which prevents the scoop from tilting backwardly.

When the scoop has been filled and transported to a desired spot after having been elevated from the ground, it can be dumped by a pull on the rope or cable 52 which leads to some convenient spot adjacent the tractor operator's seat 11. A pull on the cable or rope 52 will swing the lever 45 and its roller 48 forwardly so that the roller will disengage from beneath the catch member 50. In the event the load in the scoop is overbalanced rearwardly and the scoop will not tilt forwardly of its own accord an additional pull by the operator on the cable 52 will permit him to pull the scoop over forwardly against the overbalanced weight. For that reason it is important that the movable release be secured to the scoop per se rather than to the scoop frame.

It should be noted that the frame edge member 38 has portions thereof lying in the path of pivotal movement of the scoop shell 34 when said scoop is swung to its dumping position. This permits the operator to knock the scoop shell against the frame member 38 to completely remove sticky or hard packed material such as clay.

From the foregoing description it will be seen that I have provided apparatus which utilizes a tractor with a power drawbar lift thereon and a scoop structure which in combination with the tractor and power drawbar lift permits the scooping up of earth or other material, elevating of the loaded scoop, transportation thereof to the desired dumping point, and dumping of the scoop while in its raised position. It eliminates the need for dragging the loaded scoop over the ground as is done with scoops which are not built upon wheels and it permits the utilization of the necessary tractor wheels to support and transport the loaded scoop. When the tractor is to be used for other purposes the scoop can be quickly disconnected and other implements attached thereto. By reason of my invention it is unnecessary to have scoop structures which are mounted upon their own wheels and axles, structures which naturally incur considerably more cost in manufacture.

One of the great advantages of the invention is the ability to load and elevate a scoop of the type described and to transport the elevated scoop in a forward and a reverse direction. The ability to move the scoop and tractor unit rearwardly permits the operator to back up to a fill and to dump the scoop from its elevated position on the exact spot desired. Scoops which are dragged over the ground cannot be moved rearwardly in the manner just described and consequently lack much of the advantage of my invention.

The equipment is extremely useful in grading work where smooth finished surfaces are desired, and it is possible to quickly alter the height of the scoop relative to the wheels of the tractor by a simple manipulation of the lever 31 which controls the raising or lowering of the hydraulically operated drawbar 12. Additionally should the scoop meet with such obstruction as would likely cause damage to some of the parts the lever 31 can be manipulated to release any upward pull exerted on the drawbars 12 so that the front wheels of the tractor will not leave the ground.

The upper connection 41 between the arch frame member 38 on the scoop supporting framework and the tractor in addition to maintaining the scoop frame substantially level also tends to exert a forward pressure on the upper portion of the tractor housing and tends to keep the front wheels in proper frictional engagement with the ground.

While I have shown my invention with reference to a particular type of power operated drawbar, it is, of course, obvious that a different power drawbar lift could be employed in keeping with the plans of my invention, and it will be further understood that various changes may be made in the form, details, arrangement and proportions of the various parts without departing from the scope of my invention.

What is claimed is:

1. The combination with a tractor having a drawbar and means for elevating the same, of a scoop frame, a connection between said scoop frame and said drawbar, means for maintaining said scoop frame in an approximately vertical position as it is raised or lowered with said drawbar, a scoop pivotally mounted on said frame, and means releasably connected to said scoop to permit tilting thereof relative to said scoop frame when said scoop and frame are in raised position.

2. The combination with a tractor having a drawbar and means for elevating the same, of a scoop frame, a connection between the lower portion of said scoop frame and said drawbar, a connection between an upper portion of said scoop frame and said tractor, a scoop pivotally connected to said scoop frame, the connections between said frame and said drawbar and tractor permitting raising and lowering of said frame and scoop with said drawbar, and means for tilting said scoop to dump the same when said frame and scoop are in raised position.

3. The combination with a tractor having a drawbar and means for elevating the same, of a scoop frame, said drawbar being pivotally connected to the lower portion of said scoop frame, a member pivotally connected to an upper portion of said scoop frame and to said tractor, the points of pivotal connection of said member being disposed a substantial distance above the points of pivotal connection of said drawbar, a scoop pivotally connected to said scoop frame, said member connecting said frame and said tractor permitting raising and lowering of said frame and scoop with said drawbar, said frame in its lowered position supporting said scoop in a forwardly and downwardly tilted position, and said frame in its raised position supporting said scoop in a rearwardly and downwardly tilted position.

4. A scoop adapted for mounting upon a tractor having a power elevated drawbar or the like comprising, a lower frame section having side members and a rear member, a front upright member connected to said side members at their forward ends and also to a rearwardly disposed portion of said lower frame section, a connection between the lower forward portion of said frame and said drawbar, a connection between the upper portion of said upright and a portion of said tractor above said drawbar, said drawbar connection and upper connection permitting raising and lowering of said frame by said power operated drawbar, and a scoop shell supported by said frame side members.

5. The structure in claim 4 and said scoop shell being mounted for pivotal movement relative to said frame side members.

6. The combination with a tractor having a drawbar and means for elevating the same of, a scoop frame, a connection between the lower portion of said scoop frame and said drawbar, a connection between an upper portion of said scoop frame and said tractor, a scoop pivotally connected to said scoop frame, said frame including an abutment lying in the path of pivotal movement of said scoop to limit said pivotal movement when the scoop reaches a dumping position, the connections between said frame and said drawbar and tractor permitting raising and lowering of said frame and scoop with said drawbar, and means for tilting said scoop to dump the same when said frame and scoop are in raised position.

7. The combination with a tractor having a drawbar and means for elevating the same, of a scoop frame, a connection between the lower portion of said scoop frame and said drawbar, a connection between an upper portion of said scoop frame and said tractor, said last mentioned connection being adjustable in length to tilt said frame relative to the ground, a scoop pivotally connected to said scoop frame, the connections between said frame and said drawbar and tractor permitting raising and lowering of said frame and scoop with said drawbar, and means for tilting said scoop to dump the same when said frame and scoop are in raised position.

8. The combination with a tractor having a rearwardly extending drawbar and means for elevating the same, of a scoop frame, a connection between the lower portion of said scoop frame and the rear end of said drawbar, a connection between an upper portion of said scoop frame and said tractor, a scoop pivotally connected to said scoop frame, the connections between said frame and said drawbar and tractor permitting raising and lowering of said frame and scoop with said drawbar, and means for tilting said scoop to dump the same when said frame and scoop are in raised position.

9. A scoop adapted for mounting on a tractor or the like comprising, a frame portion, a pair of vertically spaced links pivotally connected to said frame at one end and having their other ends arranged for pivotal connection to a tractor, a scoop shell pivotally connected to said frame for tilting movement with respect thereto, a device for releasably securing said scoop shell against pivotal movement relative to said frame, means for releasing said scoop shell securing device to permit tilting movement of said scoop shell relative to said frame to a dumping position, and said links being swingable vertically to permit raising and lowering of said scoop frame and shell.

10. A scoop adapted for mounting on a tractor and the like comprising, a frame, vertically spaced connections on said frame permitting said frame to be pivtally connected to a tractor at vertically spaced points, a scoop shell pivotally connected to said frame for tilting movement relative thereto, a latch device releasably securing said shell to said frame to hold the shell against tilting movement relative to the frame, and means for actuating said latch device to release said scoop shell and permit tilting movement thereof relative to said frame.

BENJAMIN ENDER.